Patented Sept. 10, 1935

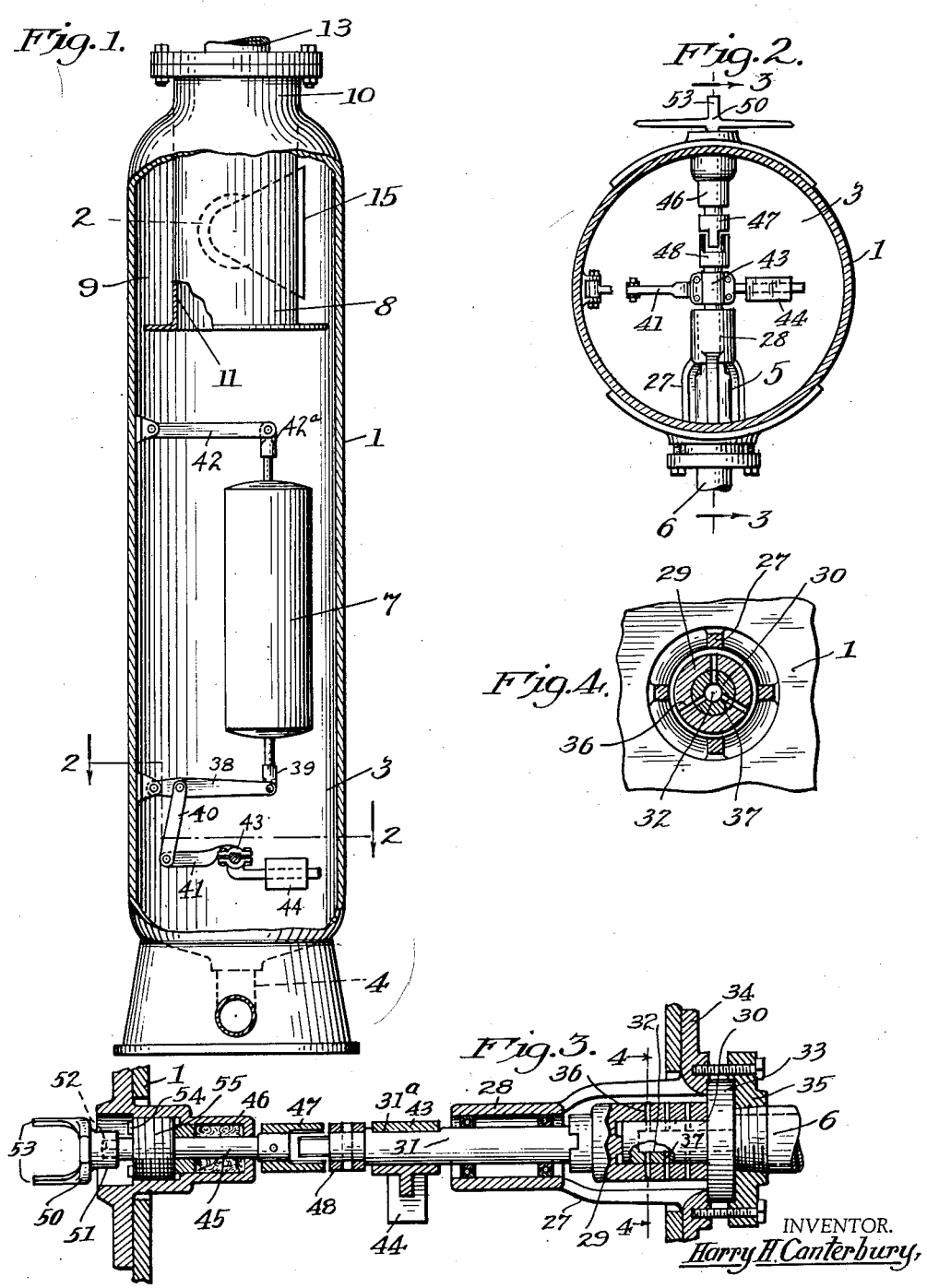

2,014,038

UNITED STATES PATENT OFFICE 2,014,038

VALVULAR CONTROL

Harry H. Canterbury, Whittier, Calif.

Original application December 24, 1931, Serial No. 583,004. Divided and this application December 19, 1932, Serial No. 647,911

5 Claims. (Cl. 137—21)

This invention is a valvular control for an oil and gas separator, the present invention being a division of my copending application Ser. No. 583,004, filed Dec. 24, 1931, now Patent No. 1,999,396, issued Apr. 30, 1935; and it is the object of the invention to provide a valvular control for the oil discharge from the separator.

Further objects of the invention will be readily understood from the following description of the accompanying drawing, in which:

Fig. 1 is a vertical section through a separator provided with the improved valvular control.

Fig. 2 is a transverse section on the line 2—2 of Fig. 1.

Fig. 3 is a detail vertical section on the line 3—3 of Fig. 2.

Fig. 4 is a detail transverse section on the line 4—4 of Fig. 3.

The valvular control is illustrated employed in connection with the oil discharge from an oil and gas separator, the separator being shown as an upright casing 1 having an inlet 2 in its side wall adjacent its upper end, and forming a settling chamber 3 at its lower end provided with a drain 4 for sand and water. A valve 5 is mounted in the settling chamber and controls discharge of oil to a communicating and outwardly projecting oil pipe 6, and the valve is regulated by a float 7 which is adapted for vertical movement in the lower portion of casing 1 responsive to variations in the liquid level in the separator.

An annular wall 8 in the upper portion of casing 1 may form a scrubbing chamber 9 having a nozzle 15 opening circumferentially into the scrubbing chamber from the inlet 2 which is adapted to receive the flow from an oil well; and a gas outlet 10 at the upper end of casing 1 communicates with an axial passageway 11 which is defined by the annular wall 8, and a gas discharge pipe 13 communicates with the outlet 10.

The incoming flow from an oil well is thus circumferentially agitated in scrubbing chamber 9 so that the oil and gas are released from their initial intimate association by centrifugal force; and after its rotary agitation the flow gravitates to settling chamber 3 for separation of the oil and gas, with the gas rising through passageway 11 for discharge at the gas outlet 10, and the discharge of oil controlled by the float actuated valve 5.

The valve 5 is preferably positioned within the casing 1 so that the operating connection between the float and valve need not project exteriorly of the casing; and for this purpose a bracket 27 may project laterally into casing 1 and terminate in a bearing 28, with the valve 5 comprising cooperating telescopic sleeves 29—30 adapted for relative rotation to open or close the valve, and having the outer sleeve 29 connected to a valve stem 31 which is journaled in bearing 28 for oscillation by vertical movement of float 7, while the inner sleeve 30 projects axially to the exterior of casing 1 for communication of its bore 32 with oil pipe 6. The outer end of sleeve 30 may have an integral flange 33 which is received against a flange 34 of bracket 27 resting against the exterior surface of the wall of casing 1, and a coupling flange 35 for the pipe 6 overlies the head 33 and is connected to flange 34 for securing the parts in assembled relation.

By the construction as thus described the valvular control may be readily assembled or removed for replacement or repair, the sleeve 29 being insertable in the bracket 27 which opens to the exterior of casing 1, with the sleeve longitudinally abutting the valve stem 31 which is held against longitudinal displacement as shown at Fig. 3, and the sleeve 30 being insertable in the outer end of sleeve 29 which opens to the exterior of the casing, with the sleeve 29 journaled on sleeve 30, and the flange 33 forming a bearing abutment for the outer end of sleeve 29 and overlying and closing the open outer end of the bracket 27.

The sleeves 29—30 have radial ports 36—37, and the bore 32 of sleeve 30 terminates short of its inner end, so that when ports 36—37 are non-alined flow of oil from settling chamber 3 to the bore 32 is shut-off, while alinement of said ports opens the settling chamber to bore 32 and thence to the oil discharge pipe 6. The operating connection between float 7 and valve stem 31 whereby valve 5 is thus opened and closed responsive to movement of the float, preferably comprises a rocker arm 38 pivoted in casing 1 below the float and connected thereto as shown at 39, with a link 40 depending from the rocker arm and connected to a lever 41 which is fixed to valve stem 31; and the float may be held in upright position by a second rocker arm 42 pivoted in casing 1 above the float and connected thereto as shown at 42ª. The lever 41 may be fixed to valve stem 31 by providing the lever with a split head 43 having a non-circular bore adapted to engage a corresponding cross-sectionally non-circular portion 31ª of the valve stem, so that the valve stem is oscillated responsive to movement of the lever; and the lever is preferably adjustably counterweighted as shown at 44 in order that the valve 5 may readily open and close responsive to movement of the float.

Means are preferably provided for manually testing the operation of valve 5 from the exterior of casing 1 while the separator is in use, but with the manual actuating means inoperative during normal operation of the separator so as to avoid excessive friction. For this purpose a stem 45 is journaled in casing 1 in longitudinal alinement with valve stem 31 and projects outwardly through the wall of casing 1 diametrically opposite the oil pipe 6, with a packing gland 46 which is mounted on the exterior surface of the wall of casing 1 adapted to receive the outwardly projecting end of the stem. A lost-motion rotary connection is provided at the proximate ends of stems 45—31, and comprises appreciably circumferentially spaced cooperating clutch elements 47—48 whereby the movement of float 7 is adapted to rock the stem 31 for opening and closing valve 5 without rotating the stem 45, while manual engagement of the outer end of stem 45 permits it being rotated so as to take up the lost-motion at clutch elements 47—48 and thereby rotate stem 31 for testing the operation of valve 5.

The stem 45 may be rotated by a wrench 50 which has a socket 51 adapted to detachably engage a head 52 at the outer end of the stem; and the opposite end of the wrench preferably forms diametrically opposite lugs 53 which by reversing the wrench are adapted to engage a cooperating slot 54 in the follower nut 55 of packing gland 46, in order that the same wrench may be used for manually rotating stem 45 and tightening its packing.

The invention thus provides an oil discharge for an oil and gas separator, controlled by a valve which has a simple operating connection for regulating the valve by the liquid level in the separator, and which may be manually tested while the separator is in use, but with said manual testing means inoperative during normal use of the separator so as to avoid excessive friction.

I claim:

1. A valvular control adapted for operative assembly in a container and comprising a bracket in the container having an opening to the exterior of the container and forming a bearing at its inner end, a valve stem journaled in the bearing and held against longitudinal displacement in the container, a sleeve insertable in the bracket through its exterior opening, with the inner end of the sleeve adapted for longitudinal abutment and operative engagement by the valve stem, the outer end of the sleeve being open, a second sleeve adapted for mounting in the first sleeve through its open end, with the first sleeve journaled on the second sleeve, the sleeves having cooperating radial ports, a flange at the outer end of the second sleeve adapted for longitudinal bearing abutment by the outer end of the first sleeve and overlying and closing the bracket opening, and means for releasably securing the second sleeve against longitudinal displacement relative to the container.

2. A valvular control adapted for operative assembly in a container and comprising a bracket in the container having an opening to the exterior of the container and forming a bearing at its inner end, a valve stem journaled in the bearing and held against longitudinal displacement in the container, a valve insertable in the bracket through its exterior opening and adapted for longitudinal abutment and operative engagement by the valve stem, the valve having a flange overlying and closing the bracket opening, and means for securing the valve against longitudinal displacement relative to the container.

3. A valvular control adapted for operative assembly in a container and comprising a valve insertable in the container through an opening therein, a valve stem held against longitudinal displacement in the container, the valve being adapted for longitudinal abutment and operative engagement by the valve stem and having a flange overlying and closing the opening in the container, and means for securing the valve against longitudinal displacement relative to the container.

4. A valvular control adapted for operative assembly in a container and comprising a bracket in the container having an opening to the exterior of the container, a sleeve insertable in the bracket through its exterior opening and fixed against inward displacement, the outer end of the sleeve being open, a second sleeve adapted for mounting in the first sleeve through its open end, with the first sleeve journaled on the second sleeve, the sleeves having cooperating radial ports, a flange at the outer end of the second sleeve adapted for longitudinal bearing abutment by the outer end of the first sleeve and overlying and closing the bracket opening, and means for releasably securing the second sleeve against longitudinal displacement relative to the container.

5. A valvular control adapted for operative assembly in a container and comprising a sleeve insertable in the container through an opening therein and fixed against inward displacement, the outer end of the sleeve being open, a second sleeve adapted for mounting in the first sleeve through its open end, with the first sleeve journaled on the second sleeve, the sleeves having cooperating radial ports, a flange at the outer end of the second sleeve adapted for longitudinal bearing abutment by the outer end of the first sleeve and overlying and closing the opening in the container, and means for releasably securing the second sleeve against longitudinal displacement relative to the container.

HARRY H. CANTERBURY.